United States Patent [19]

Nolin et al.

[11] Patent Number: 4,699,726

[45] Date of Patent: Oct. 13, 1987

[54] APPLICATION OF NON AQUEOUS FLUIDS BASED ON ALKYLENE GLYCOL MONOETHER AS HEAT TRANSFER AGENT

[75] Inventors: Claude H. A. Nolin, Martigues, France; Marcel J. Tucoulat, deceased, late of Martigues, France, by Juliette F. J. Tucoulet, Regine F. Pugliese, Christine F. Gameaux, legal representatives

[73] Assignee: BF Chemicals Limited, London, England

[21] Appl. No.: 838,134

[22] Filed: Mar. 10, 1986

[30] Foreign Application Priority Data

Mar. 26, 1985 [FR] France ................. 85 04455

[51] Int. Cl.$^4$ ............................................. C09K 5/00
[52] U.S. Cl. ............................... 252/75; 252/69; 252/73; 252/364; 568/678; 165/1
[58] Field of Search ............ 252/73, 75, 69, 364; 568/678

[56] References Cited

U.S. PATENT DOCUMENTS 2,163,899  6/1939  Walker et al. ................. 252/69

OTHER PUBLICATIONS

Miller, "Methoxy Propanol Automotive Antifreeze", Soap & Chemical Specialties, Oct. 1967.
Mellan, *Industrial Solvents Handbook,* Noyes Data Corp., 1977.

*Primary Examiner*—Robert A. Wax
*Attorney, Agent, or Firm*—Brooks Haidt Haffner & Delahunty

[57] ABSTRACT

The present invention relates to the application of a non aqueous fluid as heat transfer agent in cooling circuits or heat exchanger heating circuits, this application being characterized in that the non aqueous fluid comprising one or more alkleneglycol monoethers of the general formulae $$R^1O(CH_2CHR^2O)_mH$$

in which m is an integer equal to 1 or 2, $R^1$ is an alkyl radical comprising a number of carbon atoms from 4 to 8 where m=1, or from 1 to 5 where m=2, and $R^2$ is a hydrogen atom or a methyl radical. The present invention also relates to new compositions based essentially on alkyleneglycol monoether or monoethers, mixed with diols and/or other alkyleneglycol monoethers.

3 Claims, No Drawings

APPLICATION OF NON AQUEOUS FLUIDS BASED ON ALKYLENE GLYCOL MONOETHER AS HEAT TRANSFER AGENT

The present invention relates to the application of a non-aqueous fluid comprising one or more alkyleneglycol monoethers as heat transfer agent in cooling circuits or heat exchanger heating circuits, and also to new compositions for use as a non-aqueous heat transfer fluid.

It is known that heat transfer fluids which consist principally of aqueous mixtures based on a glycol, such as ethyleneglycol or propyleneglycol, can be used in heat exchangers, such as for example in cooling circuits of an internal combustion engines. Recently new internal combustion engines have been developed in the automobile industry with a view to reducing fuel consumption. This reduction in consumption can be obtained for example by decreasing the weight of the automobile vehicle and in particular the engine block, by the use of light alloys based on magnesium, or by increasing the energy efficiency of the engine which operates at relatively high temperatures which may be as much as 200° C., for example. The heat transfer fluids known hitherto, however, are no longer suitable for these new engines and the conditions in which they are now used. In particular, they are unable to provide effective protection against corrosion for light alloys based on magnesium, because of the corrosivity with respect to magnesium. Furthermore, these heat transfer fluids have a boiling temperature which is generally below 110° C., a temperature which is too low and therefore incompatible with the operating conditions of the new high-output engines. Furthermore, at low temperatures they have too high a viscosity to be suitably used as heat transfer agents or else exhibit a freezing point between 0° and −40° C., which necessitates the use of an antifreeze agent.

It has now been found that it is possible to use a heat transfer fluid which is capable on its own of solving all these difficulties at once. This fluid may be employed, avoiding the drawbacks referred to above, in heat exchanger circuits, especially cooling circuits, of internal combustion engines having parts made of alloys based on magnesium which operate at high temperatures.

The object of the present invention is therefore the application of a non-aqueous fluid as heat transfer agent in cooling circuits or heat exchanger heating circuits, the application being characterised in that the non-aqueous fluid comprises one or more alkyleneglycol monoethers, of the general formula

R$^1$O (CH$_2$CHR$^2$O)$_m$H in which m is an integer equal to 1 or 2, R$^1$ is an alkyl radical comprising a number of carbon atoms from 4 to 8 when m=1, or from 1 to 5 when m=2, R$^2$ is an hydrogen atom or methyl radical.

It has been found that non-aqueous fluids comprising alkyleneglycol monoethers, especially monoethyleneglycol or diethyleneglcyol monoethers or monopropyleneglycol or di-proplyeneglycol monoethers, such as those referred to above, are capable of being used as heat transfer agents in cooling circuits or heat exchanger heating circuits operating in a comparatively broad temperature range which may, for example, go from −60° C. to +200° C. and in particular −50° C. to +170° C. These non-aqueous fluids, in fact, have the advantage both of a low viscosity at temperatures as low as -40° C., and excellent thermal stability at temperatures as high as +170° C. or +200° C., and, suprisingly, corrosivity which is negligieable or nil with respect to magnesium or its alloys under such varied conditions of use. Thus it has been found that it is possible to use a fluid which surprisingly possesses all these properties in itself as heat transfer agents in cooling circuits such as those of internal combustion engines comprising parts of light alloy based on magnesium and operating at high temperatures, and in addition this fluid does not require the use of an anti-freeze agent.

Moreover, the non-aqueous fluids have a comparatively satisfactorily compatibility with respect to elastomers or rubbers which are present in the various parts of the cooling circuits, for example in the form of gaskets or flexible connections. Such behaviour may appear all the more unexpected since it is known that bringing elastomers or rubbers into contact with compounds comprising an ether function generally produces harmful effects, such as the swelling of these materials. It is also important to note that these non-aqueous fluids are not regarded as flammable products as defined by the criteria employed by the legislation of the European Communitys in directive no. 67/548/EEC of the June 27th 1967 relating to the packaging and labelling of chemical substances. In fact the flash point of the non-aqueous fluids is above 55° C. and generally above 70° C. Furthermore the miscibility with water of these fluids is generally sufficient to avoid the formation of two separate phases during any contact of these fluids with water.

The non-aqueous fluids employed according to the present invention comprise one or more alkyleneglycol monoethers of the general formula

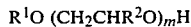

R$^1$O (CH$_2$CHR$^2$O)$_m$H in which m is an integer equal to 1 or 2. When m is equal to 1, R$^1$ is a normal or branch-chained alkyl radical comprising 4 to 8 carbon atoms for example an n-butyl, n-hexyl, ethyl-2 butyl or ethyl-2 hexyl radical. When the radical R$^1$ comprises less than 4 carbon atoms, it is observed that in this case the alkyleneglycol monoethers cannot be used as basic constituents of the non-aqueous fluid, because of their low boiling point and low flash point, and also because of a certain amount of corrosivity which they may show with respect to magnesium or its alloys. On the other hand, when a non-aqueous fluid comprising at least one alkyleneglycol monoether having a radical R$^1$ comprising more than 8 carbon atoms is used, it is found that this fluid has both poor compatability with respect to elastomers or rubbers, too high a viscosity at low temperatures and a mediocre miscibility with water.

When in the general formula

R$^1$O (CH$_2$CHR$^2$O)$_m$H m is equal to 2, R$^1$ is a normal or branch-chained alkyl radical comprising 1 to 5 carbon atoms. When the number of carbon atoms is over 5, it is found that in this case the alkyleneglycol monoethers cannot be used as non-aqueous heat transfer fluids, especially at low temperatures, in view of their high viscosity at −40° C., and the fact that they generally have poor compatibility with respect to elastomers or rubbers and also mediocre miscibility with water.

Moreover, when alkyleneglycol monoethers of the general formula $$R^1O\,(CH_2CHR^2O)_mH$$

in which m is over 2 are used as the essential constituent of non-aqueous heat transfer fluids, it is found that these fluids have numerous drawbacks in the application according to the present invention, in particular a certain amount of thermal instability at high temperatures, too great a viscosity at low temperature and a mediocre miscibility with water.

According to the present invention, therefore it is preferable to use one or more of the alkyleneglycol monoethers chosen from amongst the monomethyl ether of diethyleneglycol, monoethylether of diethyleneglycol, monopropyl ether of diethyleneglycol, monobutylether of diethyleneglycol, monomethylether of dipropyleneglycol, monoethylether of dipropyleneglycol, monoproplyether of dipropylenegycol and monobutylether of dipropyleneglycol. More especially it is preferred to use the monoethylether of diethyleneglycol.

It is possible to add to the non-aqueous heat transfer fluids diols and/or alkyleneglycol monoethers which are different from those used according to the present invention. In this way one can obtain new non-aqueous heat transfer fluid compositions, which are especially well suited to certain operating conditions of internal combustion engines, such as for example relatively high temperatures, or suited to certain atmospheric conditions such as very low ambient temperatures, these new compositions are capable of affording a more specific protection against the corrosion of certain metals, and/or against an improved compatibility in respect of certain elastomers or rubbers.

The present invention therefore also relates to new non-aqueous heat transfer fluid compositions, characterised in that they comprise constituents (a), (b), (c) employed in the mixtures (a)+(b), or (a)+(c), or (a)+(b)+(c), these constituents being (a) 100 parts by weight of one or more alkyleneglycol monoethers of the general formula $$R^1O\,(CH_2CHR^2O)_mH$$

in which m is an integer equal to 1 or 2, $R^1$ is an alkyl radical comprising a number of carbon atoms from 4 to 8 when m=1 or from 1 to 5 when m=2, and $R^2$ is a hydrogen atom or a methyl radical, (b) 0 to 30 parts, preferably 2 to 15 parts by weight of one or more alkyleneglycol monoethers of the general formula $$R^3O\,(CH_2CHR^4O)_nH$$

in which is n is an integer from 1 to 6, $R^3$ is an alkyl radical comprising a number of carbon atoms:
from 1 to 3, when n=1,
from 6 to 8, when n=2, or
from 1 to 8 when n has a value from 3 to 6,
and $R^4$ is a hydrogen atom or a methyl radical, (c) 0 to 40 parts, preferably 5 to 20 parts by weight of one or more diols of the general formula $$HO\,(CH_2CHR^5O)_pH$$

in which p is an integer from 1 to 3 and $R^5$ is a hydrogen atom or a methyl radical.

Thanks to these new compositions, in this way one can obtain non-aqueous heat transfer fluids whose properties may to a certain extent be controlled at will by the addition of appropriate quantities of constituents (b) and/or (c) to the essential constituent (a).

In particular, compositions comprising: 100 parts by weight of one or more alkyleneglycol monoethers chosen from amongst the monomethylether of diethyleneglycol, the monoethylether of diethyleneglycol, the monopropylether of diethyleneglycol, the monobutylether of diethyleneglycol, monomethyether of dipropyleneglycol, the monomethlyether of dipropyleneglycol, the monopropylether of dipropyleneglcol and the monobutlyether of dipropyleneglycol, preferably the monoethylether of diethyleneglycol, and 0 to 40 parts, preferably 5 to 20 parts by weight of ethyleneglycol or propyleneglycol may be used.

It is found that compositions containing in particular or diols, according to the definition of the constituents (c) refer to above, have an improved compatibility with respect to elastomers or rubbers, such as ethylene/propylene copolymers, butadiene/acrylonitrile copolymers or "butyl" rubbers.

These new compositions may be prepared by mixing the constituent (a), (b) and/or (c) by known methods for mixing liquids, at a temperature which may be between 0° and 100° C., preferably at ambient temperature (20° C.).

It is also possible to add to the non-aqueous fluids or compositions of the invention additives in themselves known, such as for example corrosion inhibiting agents, such as tolyltriazole or a potassium nitrate, basic compounds which can serve as a reserve of alkalinity, such as alkanolamines and anti-foaming or anti-precipitating agents. These additives must be soluble in non-aqueous fluids or in the composition and are generally employed in a quantity at most equal to 5% by weight in relation to the non-aqueous fluids or the said compositions. In this way fluids or compositions of the invention are obtained which are ready for use and which are particularly well adapted to the cooling circuits of internal combustion engines, in which circuits these fluids or these compositions come in contact with various metals, alloys, elastomers or rubbers, making up the various parts of these circuits.

The non-restrictive examples below illustrate the present invention.

EXAMPLE 1

A non-aqueous heat transfer fluid (A) ready for use is prepared by mixing at ambient temperature (20° C.): 100 part by weight of monoethlyether of diethyleneglycol of the formula $$C_2H_5O\,(CH_2CH_2O)_2H$$

0.5 part by weight of aminomethylpropanol 0.2 part by weight of tolyltriazole 0.5 part by weight of diphenylolpropane, and 0.2 part by weight of potassium nitrate.

The results of the measurements of the physical properties performed on the non-aqueous fluid (A) are set out in Table I, in particular the boiling and freezing temperatures, the viscosity at −40° and +20° C., the miscibility with water at 20° C. and the compatibility with respect to elastomers and rubbers, such as ethlyene/proplyene compolymers (EPR), "butyl" rubbers and butadiene/acrylonitrile copolymers.

ethylene/propylene (EPR), butadiene/acrylonitrile copolymers and "butyl" rubbers.

TABLE I

| | Properties of non-aqueous heat transfer fluid compositions | | | | | |
|---|---|---|---|---|---|---|
| Non-aqueous Fluid Composition | Boiling Temperature (°C.) | Freezing Temperature (°C.) | Viscosity at −40° C. (centistokes) | Viscosity at +20° C. (centistokes) | Miscibility with water (20° C.) | Compatibility with respect to elastomers and rubbers[1] |
| A | 202 | −78 | 23 | 4.5 | complete | good |
| B | 193.5 | −60 | 35.2 | 6.6 | complete | very good |

[1]Ethylene/propylene copolymer (EPR), butadiene/acrylonitrile copolymer, "butyl" rubber.

TABLE II

| Corrosion measurements performed according to the standard ASTM-D-1384/70 | | | | | | | |
|---|---|---|---|---|---|---|---|
| Non-aqueous Fluid | Variations in weight expressed in mg/test piece | | | | | | |
| Composition | Copper | Solder | Brass | Steel | Cast Iron | Aluminium | Magnesium |
| A | −5 | −2 | −5 | −1 | −1.5 | −2 | −2.5 |
| B | −6 | −1 | −5 | −0.5 | −2 | −3 | −2 |

Tests of resistance to corrosion of metallic test pieces are carried out by immersion in the non-aqueous fluid (A). The quality of the metals or alloys used and also all the operating conditions for these tests are defined by the Standard ASTM - D - 1384/70. Corrosion is demonstrated by the variation in weight of each test piece (expressed in milligrams) at the end of a given period. The results of the corrosion measurements are given in Table II.

According to the analysis of these results as a whole, it is found that the non-aqueous fluid (A) may be used conveniently as a heat transfer agent in a cooling circuit of an internal combustion engine operating at high temperature, which may reach 180° C., under atmospheric conditions where the ambient temperature may drop to −40° C., without showing marked corrosiveness in respect of magnesium or its alloys.

EXAMPLE 2

A non-aqueous heat transfer fluid composition (B) ready for use is prepared by mixing at ambient temperature (20° C.): 100 parts by weight of monoethylether of diethyleneglycol 11.3 parts by weight of ethyleneglycol 0.5 part by weight of aminomethylpropanol 0.2 part by weight of tolyltriazole 0.5 part by weight of diphenylolpropane and 0.2 part by weight of potassium nitrate.

The results of the measurement of the physical properties performed on composition (B) are set out in Table I. In addition, in Table II the results of the corrosion measurements performed in a manner identical to that in Example 1 are given, except for the fact that instead of using non-aqueous fluids (A) composition (B) is used.

From the analysis of these results as a whole it is found that composition (B) may be employed conveniently as a heat transfer agent in a cooling circuit of an internal combustion engine operating at a high temperature which may reach 180° C., under atmospheric conditions where the ambient temperature may drop to −40° C., without showing marked corrosivity with respect to magnesium or its alloys and without causing a certain deterioration in elastomers and rubbers such as

We claim:

1. In a process for transferring heat in a cooling circuit or heat exchanger heating circuit having parts of a light alloy based on magnesium and parts of elastomers or rubbers, and operating in a temperature range from −60° to +200° C., the improvement which comprises using as a heat transfer medium a non aqueous fluid essentially consisting of:
   (a) 100 parts by weight of one or more alkylene glycol monoethers (A) of general formula $$R^1O\ (CH_2CHR^2O)_mH$$

in which m is an integer equal to 1 or 2, $R^1$ is an alkyl radical comprising a number of carbon atoms from 4 to 8 when m=1, or from 1 to 5 when m=2, and $R^2$ is a hydrogen atom or a methyl radical.
   (b) 0 to 30 parts by weight of one or more alkylene glycol monoethers (b) of the general formula $R^3O\ (CH_2CHR^4O)_nH$ in which n is an integer from 1 to 6, $R^3$ is an alkyl radical comprising a number of carbon atoms from 1 to 3 when m=1, from 6 to 8 when n=2, or from 1 to 8 when n has a value of 3 to 6, and $R^4$ is a hydrogen atom or a methyl radical,
   (c) 0 to 40 parts by weight of one or more diols (C) of the general formula $$HO(CH_2—CHR^5O)_pH$$

in which p is an integer from 1 to 3, and $R^5$ is a hydrogen atom or a methyl radical.
   (d) 0 to 5 parts by weight in relation to the composition of one or more additives soluble in the composition chosen amongst corrosion inhibiting agents, mineral or organic bases and antifoaming or anitprecipitating agents.

2. In a process according to claim 1, the improvement being characterized in that the alkylene glycol monoethers (A) are chosen from amongst the monoethyl ether of diethylene glycol, dipropylene glycol, and the monobutyl ether of dipropylene glycol.

3. In a process according to claim 1, the improvement being characterized in that the diol (C) is ethylene glycol or propylene glycol.

* * * * *

UNITED STATES PATENT AND TRADEMARK OFFICE
CERTIFICATE OF CORRECTION

PATENT NO. : 4,699,726

DATED : October 13, 1987

INVENTOR(S) : Claude H.A. Nolin et al

It is certified that error appears in the above-identified patent and that said Letters Patent is hereby corrected as shown below:

Title page (73) Assignee, "BF Chemicals limited" should read -- BP Chemicals Limited --.

Signed and Sealed this

Twelfth Day of April, 1988

Attest:

DONALD J. QUIGG

Attesting Officer

Commissioner of Patents and Trademarks